US006259787B1

(12) United States Patent
Schulze

(10) Patent No.: US 6,259,787 B1
(45) Date of Patent: Jul. 10, 2001

(54) TELEPHONE ALARM AND MONITORING METHOD AND APPARATUS

(75) Inventor: Herbert C. Schulze, Reno, NV (US)

(73) Assignee: Dynachieve, Inc., Reno, NV (US)

( * ) Notice: Subject to any disclaimer, the term of this patent is extended or adjusted under 35 U.S.C. 154(b) by 0 days.

(21) Appl. No.: 09/085,328

(22) Filed: May 26, 1998

(51) Int. Cl.$^7$ .................................................. H04M 11/00
(52) U.S. Cl. .............................. 379/352; 379/38; 379/37; 340/539; 340/693.5
(58) Field of Search .................................... 379/352, 355, 379/354, 37, 38, 40, 45; 340/825.64, 426, 539, 531, 568.1, 571, 573.1, 665, 693.1, 693.5, 693.12; 455/404, 422

(56) References Cited

U.S. PATENT DOCUMENTS

| Re. 34,677 | * | 7/1994 | Ray et al. ........................... 379/37 |
| 4,137,429 | * | 1/1979 | Stockdale ............................. 379/42 |
| 4,237,344 | * | 12/1980 | Moore .................................. 379/38 |
| 4,453,043 | * | 6/1984 | Zielinski et al. ..................... 179/90 |
| 5,465,296 | * | 11/1995 | McMonagle, Jr. et al. ......... 379/354 |
| 5,475,750 | * | 12/1995 | McMonagle, Jr. et al. ......... 379/355 |
| 5,475,751 | * | 12/1995 | McMonagle, Jr. et al. ......... 379/355 |
| 5,742,666 | * | 4/1998 | Alpert ................................. 455/404 |
| 5,896,565 | * | 4/1999 | Miller ................................. 455/404 |

\* cited by examiner

*Primary Examiner*—Stella Woo

(57) ABSTRACT

A method and apparatus for activating a telephone so as to automatically connect to another telephone wherein the activation of the telephone is by means of electrical power delivered by the action of an electrical impact switch upon receiving an impact and particularly wherein the telephone is a cordless telephone handset concealed in another object with the impact switch activation means such the object may be jolted by dropping it or otherwise causing the telephone to go off-hook with immediate automatic dialing of another telephone number.

2 Claims, 2 Drawing Sheets

TELEPHONE ALARM AND MONITORING METHOD AND APPARATUS

CROSS REFERENCE TO RELATED PATENT APPLICATIONS

There are no patent applications filed by me related to this application.

BACKGROUND OF THE INVENTION

I. FIELD OF THE INVENTION

This invention is in the general fields of alarms and monitoring systems and equipment.

The invention is more particularly in the fields of silent alarms, emergency, and invalid monitoring.

The invention is even more particularly directed to the field of an alarm or monitoring device which is activated overtly, or covertly, by mere disturbing of an article.

II. DESCRIPTION OF THE PRIOR ART

There are many emergency alarm and monitoring systems, too numerous to detail here. All heretofore available emergency alarm and monitoring systems require installation of elaborate telephone or other equipment.

Additionally, all heretofore known or available alarm or monitoring systems required a reasonable degree of mental/physical coordination for the pressing of buttons, or the like.

The present invention requires only a minute ability to contact, or move, an object in order to sound an alarm or monitor a location, give the location, and enable one at a distance from the location to know the location and obtain knowledge of activities at the location sending the alarm or being monitored. The manner in which the present invention works is that a telephone or the like is activated by means of an impact switch.

There is no prior art known to me in this latter described field. In that sense, there is no prior art.

SUMMARY OF THE INVENTION

There are many uses for silent alarms and monitoring devices. Some examples of such uses are silent alarms in banks, convenience stores, and the like; home uses for signaling the presence of an intruder, or the like; home and health care uses for signaling an emergency or other need. There are numerous other examples.

Heretofore systems for satisfying these needs all require expensive installation of equipment and they all require that a person activating the device must have some reasonable muscular ability and coordination.

Frequently the ability to be unnoticed in sending an alarm is important. For example, in banks, convenience stores, service stations, etc. the triggering of an alarm may well be easily detected by an alert intruder.

I have found that even the most severely handicapped quadriplegics can generally move their heads slightly, or make other simple movements. Likewise, persons under observation—even life threatening observation—who cannot noticeably activate an alarm, must, without suspicion, take certain activities, such as open a cash drawer, as may be demanded by an intruder.

I have studied this situation and all of the previously available equipment and systems. Nothing solves the problems outlined.

I have now conceived and developed what I believe to be the ultimate solution to the problems outlined above.

I have accomplished this by activating a cordless telephone or the like by means of an impact activated electrical switch which switches a cordless telephone handset or the like on. The handset can be located in any common object such as a hollowed out book, a hollow ball, a package, or most any other object. The user of this device has merely to knock the object off a table or shelf, or in some other manner jar it to cause the cordless handset or the like to be activated by means of the action of the impact switch in response to the jarring. The moment the handset is turned on, a speed dialer automatically dials to dial a pre-selected number. The number dialed can be any number within the capabilities of the dialer. For example, the number can be 911 for contact to a government emergency operator. The number can be to a monitoring service, or a personal number of any kind. The number can, also, be to an organization system number such as a nursing station in a hospital or nursing home.

Preferably, the receiving telephone will have caller identification capability so that the phone number and location of the activated phone can be immediately identified.

The cordless phone will remain activated until it is reset (turned off). Thus, it will be possible that any noise in the location of the handset may be heard through the receiving telephone.

I have used, and will use, the terms "cordless telephone", "cordless phone" "cordless phone handset" and the like. It will be understood by those skilled in the art throughout this patent application that "cellular telephones", "pagers", and other devices, the equivalent of the specific devices described and illustrated, are intended to be included.

It is an object of this invention to provide a method for incapacitated persons to give notice that they require attention.

It is another object of this invention to provide an emergency notification system which will not be recognized as being activated by persons in the area when activated.

Another object of this invention is to provide a monitoring system by which persons can give notice of an emergency or other requirement without the necessity of speaking.

Another object of this invention is to provide an impact operated telephone activation method and apparatus.

Another object of this invention is to provide a means of communication by telephone or the like between severely handicapped persons and other persons.

The foregoing and other objects and advantages of this invention will become clear to those skilled in the art upon reading the description of a preferred embodiment, which follows, in conjunction with a review of the appended drawings.

DESCRIPTION OF A PREFERRED EMBODIMENT

Inventory of items identified by numeral:

| Numeral | Item |
|---|---|
| 10 | cordless phone handset with control unit |
| 20 | control unit |
| 21 | control unit battery |
| 22 | control unit electrical impact switch |
| 23 | control unit reset switch |
| 30 | control unit electrical latching relay |
| 31 | latching relay set coil |
| 32 | phone battery latch switch |
| 33 | auxiliary latch switch |
| 34 | latching relay reset coil |
| 40 | cordless phone handset |
| 41 | cordless phone handset sending unit |
| 42 | cordless phone handset battery |
| 43 | cordless phone handset battery positive lead |
| 44 | first cordless phone handset battery negative lead unit |
| 44a | second cordless phone handset battery negative lead unit |
| 44b | third cordless phone handset battery negative lead unit |
| 45 | time delay |
| 50 | cordless phone base unit |
| 51 | first telephone cord |
| 60 | hot line phone dialer |
| 61 | second telephone cord |
| 70 | connection to telephone network |
| 71 | telephone network |
| 80 | receiving telephone |
| 81 | telephone caller identification readout |
| 100 | invalid patient |
| 101 | bed |
| 102 | pillow |
| 103 | bed sheet |
| 110 | table |
| 130 | cabinet |

Figure 1:
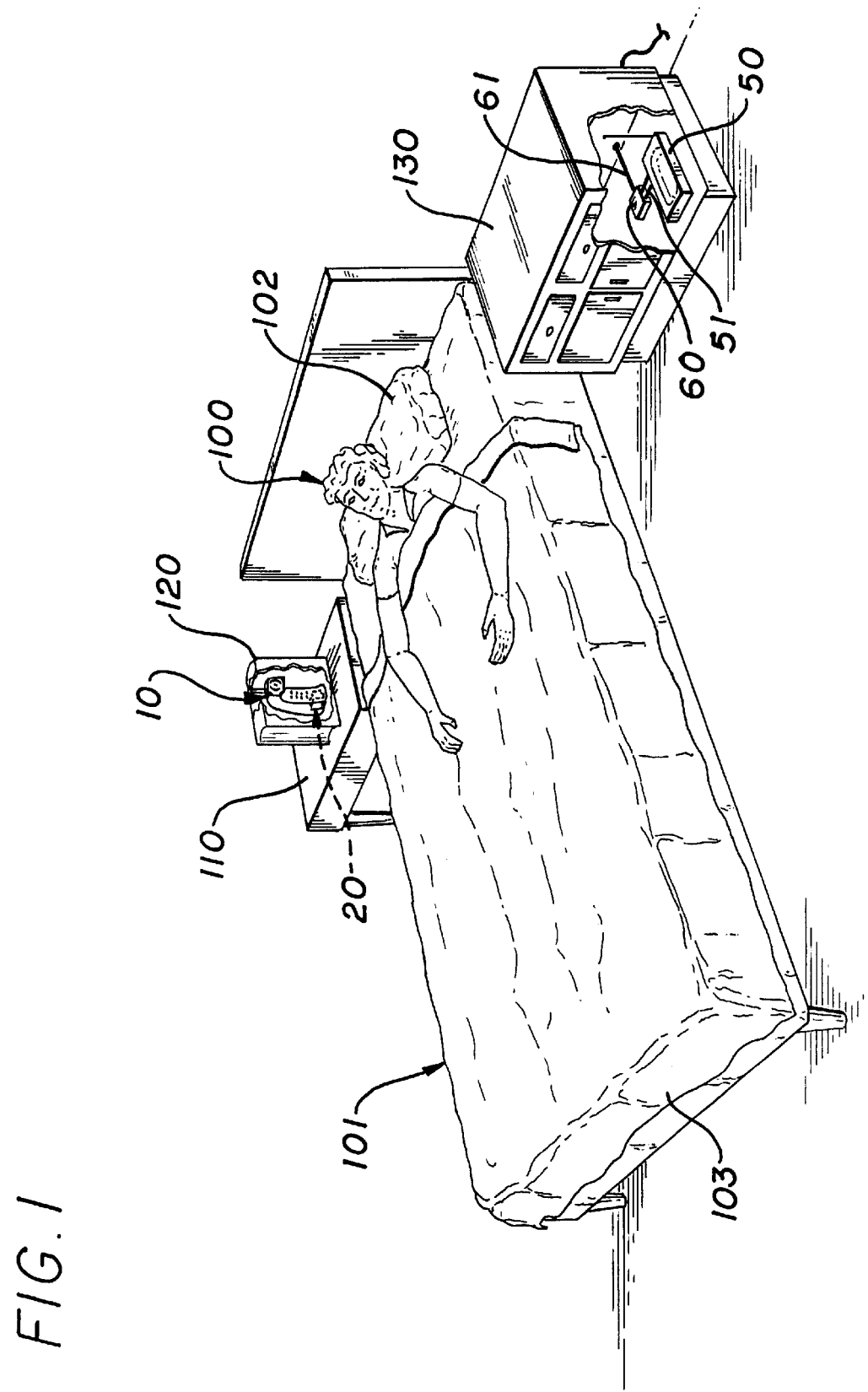
FIG. 1 is a schematic perspective of an invalid in bed with an apparatus suitable to practice the method of this invention available adjacent the bed.

FIG. 1 illustrates an invalid patient 100 confined to a bed 101 covered with a sheet or the like 103 with the patient's head resting on pillow 102. A bedside table 110 supports a hollowed out book 120 which contains cordless phone handset 10 and control unit 20. The cordless phone base unit 50 connected by first telephone cord 51 through hot line phone dialer 60 to second telephone cord 61 is located in a cabinet, dresser, or the like. The second telephone cord 61 will be connected to a telephone system jack or the like (not shown, but understood by those skilled in the art Assuming that the invalid patient is a stroke victim, or invalided by some other illness or accident in such manner that the patent cannot control his or her movements sufficiently to operate a telephone in the usual manner the patient need merely knock the hollowed out book over, or push it off the table.

This action of jarring the telephone handset and control unit will activate the control unit impact switch 22 in turn activating the control unit electrical latching relay. This results in the phone battery latch switch 32 connecting first cordless phone handset battery negative lead unit 44 to second cordless phone handset battery negative lead unit 44a. It will be noted that there is a second latch switch 33. This is shown since it is common for latching switches to be double pole double throw. The existence of the second latch switch makes it possible to also activate an alarm siren or other device if desired. In most uses of this invention the second latch switch will not be used, or a single pole latch switch may be used in the apparatus if desired.

A customary time delay 45 may be inserted at this point. The time delay is for the purpose of allowing time to reset in case of accidental activation. For example, a nurse or orderly may be tidying up the room and accidently bump into the table 110 causing the book 120 to fall. The nurse or orderly could then have time to reset the unit by activating the control unit reset switch. While not shown, it will be understood by those skilled in the art that pin hole access to the reset switch, or other unnoticeable arrangements may be made. The reset switch itself will be a customary momentary contact switch, known to those skilled in the art. When the time of the time delay has expired, without reset intervention, third cordless phone handset battery negative lead unit 44b will receive current from second cordless phone handset battery negative lead 44a and thus complete the circuit. Clearly, if there is no time delay in the circuit lead 44b will be unnecessary and lead 44a will go directly to the hand set sending unit 41.

When the circuit to the handset sending unit is complete and activated, the handset sending unit will be activated (or, go off-hook). Some cordless phone handsets may require that the "talk" button be momentarily depressed, shorting across the circuits to go off hook. This can be accomplished by electro-mechanical means such as solenoids or the like as will be understood by those skilled in the art. A better way is to short across the circuits directly within the handset circuit to go off-hook as is known to those skilled in the art.

It is important to understand that impact switches can be made extremely sensitive requiring only the slightest movement to activate, or they can be made to require almost any required degree of shock to activate. For most uses a fairly sharp jolt, or jarring, should be required. This will avoid accidental and unintended activation such as could occur by someone picking up an article or package which contains the phone handset and control unit. However, there are some important possible uses for extremely sensitive units. For example, sometimes persons who are mentally alert are, as a result of illness or accident, unable to move any part of their bodies with the exception of slight head and neck movement. In that case, an extremely sensitive unit could be placed very close to the person's head so that that person could activate the unit by a slight tap against the unit with the head.

When the unit has been activated an automatic dialing to a preset telephone number or the like will occur. Many phones can be programmed to automatically dial a number as is known to those skilled in the art. I have found through my experimentation that perhaps the most reliable way to do this is through a hot line speed dialer. For example, the Viking Electronics, Inc. of Hudson, Wis. has touch tone and pulse hot line dialers (Viking Model K-1900-4 (pulse) and Model K-1900-5 (touch tone). I have used a Model K-1900-5 with excellent results in my experiments with the method and apparatus of this invention. These Viking dialers have another advantage. They can be programmed to pause between dialing different digits of a number being dialed. Such pauses can accomplish the results desired of a time delay, thus eliminating the need for a separate time delay in case of accidental activation.

In the example used in this description, when the invalid patient in bed knocks over the book, the impact activated handset sender 41 sends notice to the base unit as indicated by the arrows between 41 and 50. The base unit 50 then activates a hot line dialer 60 which dials a preset number, or dials from its own memory. That number can be a government emergency number such as 911, or it can be a family member or friend, it can be a monitoring service, or it can even be an extension number within a local organization such as a nursing home or hospital.

The number will go through the telephone network 71 to the receiving telephone 80. The receiving telephone will preferably be equipped with a caller identification unit (known to those skilled in the art). When the call comes into the receiving telephone, the telephone number of the impact activated phone will appear at the readout 81. A person at the receiving telephone will then be able to identify the phone number from which the call originated, thus will be able to identify the location of that phone in order to respond to that location immediately. The identification can be immediately read out, not only as a phone number, but by computer means known to those skilled in the art it can read out as an address. Additionally, the impact activated phone stays on and a person at the receiving phone can hear any noises which may be occurring at the location of the impact activated phone.

Figure 2:
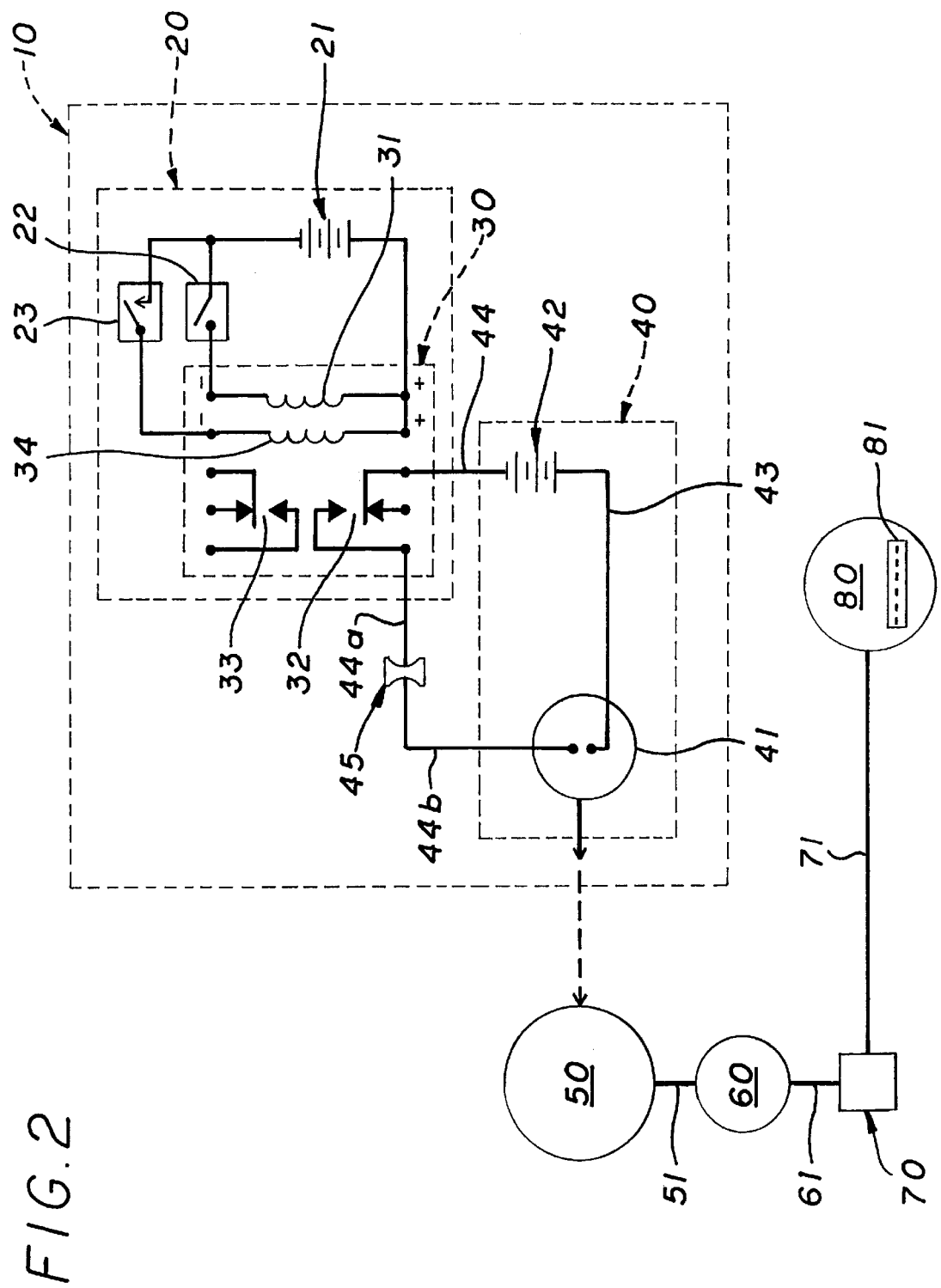
FIG. 2 is a schematic diagram of circuitry and elements which will enable the practicing of the method of this invention.

After the purpose of the call has been satisfied, the system is reset for readiness for a new operation by pressing the momentary contact reset switch 23. This causes the latch switches 32 and 33 to return to the positions shown in FIG. 2.

I have shown separate power means for the telephone and the control circuit. It should be understood that one power means could be used for both purposes. I deem it desirable to have separate power means since there is less drain on the telephone power means. However, if desired, the one telephone power means will suffice. In that case, the positive sides of the latching relay set and reset coils could be connected to the positive side of the telephone power means and the negative side of the telephone power means could be connected to the impact switch and the reset switch.

I have described this invention with an illustration of an invalid causing the transmission. This is only one of the many uses for this invention.

As a silent alarm, an apparatus of this invention could be located on a shelf in a bank, a store, a home, next to a bed, or the like. A teller, a clerk, an individual in bed, anyone having an apparatus of this invention can unobtrusively send a message that there is an emergency, or other requirement, by jarring the apparatus, by dropping it, kicking it, moving it, etc.

Concealing the impact activated handset in some common, easily displaced object is a simple matter. The variety of objects suitable for this purpose is endless. A few things are books, gift packages, shipping containers, kitchen utensils, toys, handbags, brief cases, and the like. Also, there is the possibility of concealing the impact activated phone within a structure of some sort such as a pole, a door, a wall, or the like. In this case, sudden closing of a door or bumping into a pole, etc. would activate the phone. Since the base unit is preferably located at a distance from the handset, there is no sound to indicate the activation of the phone.

Charging of the phone battery is simple. Quick disconnect connectors can be used at the battery leads in order to remove the battery from the circuit, after which the battery can be charged with a customary charger. In those cases where the impact activated phone is built into a structure such as a door, pole, shelf, or the like, the handset can be powered from line voltage using an adapter as is known to those skilled in the art. In such cases, there would be no need for charging a battery and the impact switch would merely be in one leg of the power source as will be known to those skilled in the art.

While the embodiments of this invention shown and described are fully capable of achieving the objects and advantages desired, such embodiments have been disclosed for purposes of illustration only, and not for purposes of limitation.

I claim:

1. A method for signaling that assistance is required at a first location comprising: preprogramming a wireless telephone handset circuitry with an emergency number to dial automatically upon being powered for telephone message transmission; equipping said wireless telephone handset circuitry with a power circuitry including a normally open latching switch which, when closed will power said handset, a first momentary contact impact switch means connected between a source of electrical power and said latching switch in such manner that upon impact a first momentary surge of power will flow to and close said latching switch and cause power to be connected to said telephone handset circuitry, and a second momentary switch means which upon activation will cause a second momentary surge of power to flow to and open said latching switch so as to cause power to be disconnected from said telephone handset circuitry; placing said wireless telephone handset within an inconspicuous package with the appearance of a common household article capable of being carried by hand; and deliberately subjecting said package to an impact.

2. Emergency telephone means comprising: a package suitable to be carried by hand and having the appearance of an ordinary household article; and a wireless telephone handset circuitry including power circuitry including a normally open latching switch which when closed will power said handset, a first momentary contact impact switch means connected between a source of electrical power and said latching switch in such manner that upon impact a first momentary surge of power will flow to and close said latching switch and cause power to be connected to said telephone handset circuitry, and a second momentary switch means which upon activation will cause a second momentary surge of power to flow to and open said latching switch so as to cause power to be disconnected from said telephone handset circuitry located within said package.

* * * * *